March 4, 1952     R. T. ANDERSON     2,588,070
SOLVENT EXTRACTION COMBINATION
Filed Dec. 9, 1948
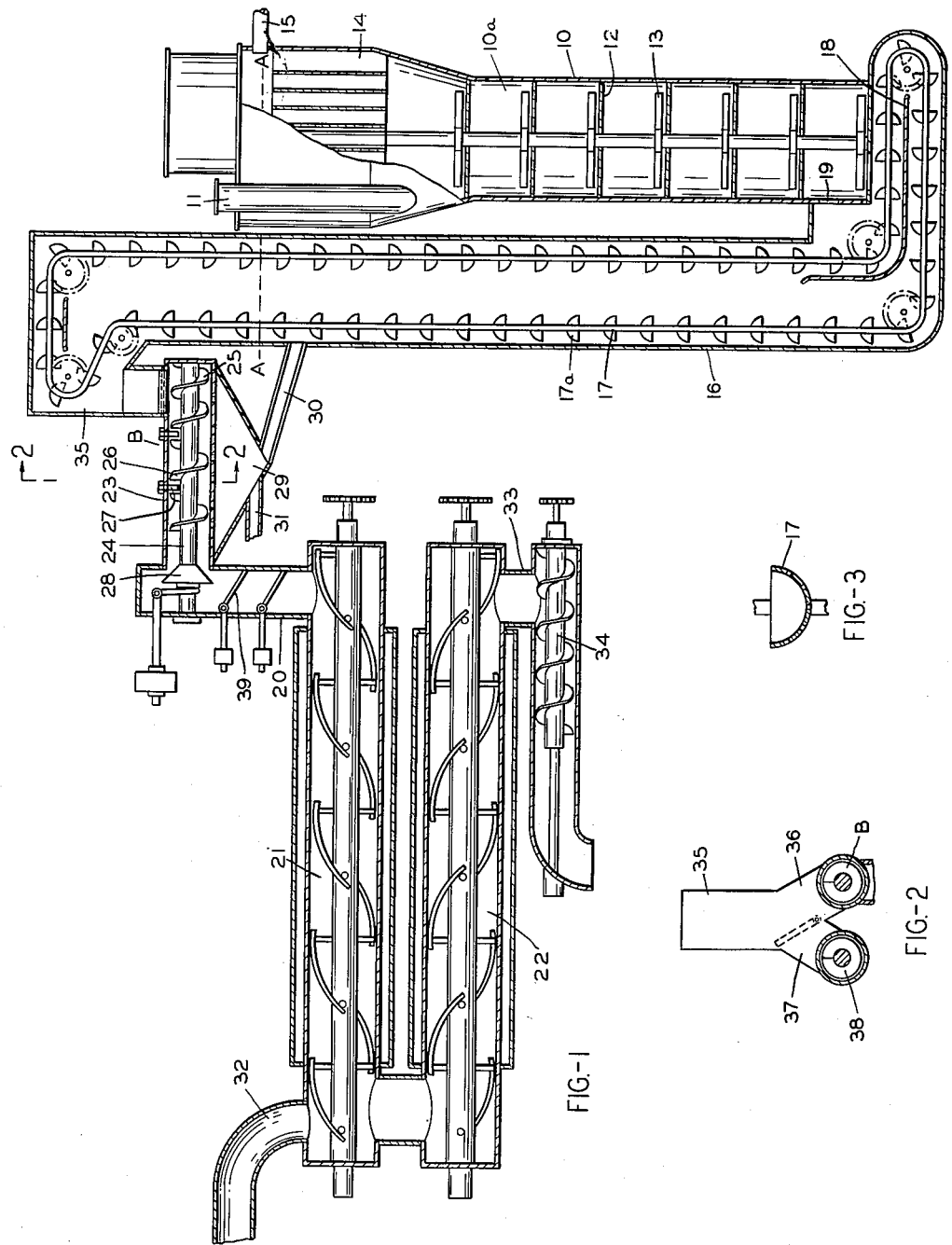
*INVENTOR.*
RAYMOND T. ANDERSON
BY
ATTORNEYS Patented Mar. 4, 1952

2,588,070

UNITED STATES PATENT OFFICE 2,588,070

SOLVENT EXTRACTION COMBINATION

Raymond T. Anderson, Lakewood, Ohio, assignor to The V. D. Anderson Company, Cleveland, Ohio, a corporation of Ohio Application December 9, 1948, Serial No. 64,320

2 Claims. (Cl. 23—270)

This invention relates to solvent extraction apparatus, such as is used for extracting oil from seeds, nuts and other oil-bearing material by the application thereto of a volatile solvent, such as hexane. The invention has more particular relation to the continuous withdrawal of the oil free solid material from the bottom of the extracting tower, removal of excess liquid therefrom, drying of the remaining solid, and recovery of solvent vapours or liquid.

One object of the invention is to provide improved means for continuously withdrawing the treated solid material without any necessity for valve mechanism, such as of the screw press variety, to maintain a head of liquid in the extracting tower.

Another object is to improve the manner of supply of liquid to the tower, avoiding unnecessary turbulence and increasing the efficiency and capacity of any given apparatus.

Another object is to provide improved apparatus for the purpose which requires little if any attention and will continue in operation for long periods without getting out of order.

Another object is to reduce the amount of vapour necessary to be condensed for recovery purposes.

Another object is to utilize conveyor mechanism for elevating the extracted solid material through a column of the extracting solvent liquid to a point where it may be appropriately treated for separating all solvent therefrom, thus dispensing with valve mechanism otherwise necessary for such operations.

Finally, the invention has for its object to provide a simple, satisfactory continuously operating solvent extracting system which has high efficiency and delivers high quality product but which nevertheless is durable and not likely to get out of order in service.

Further objects of the invention in part are obvious and in part will appear more in detail hereinafter.

In the drawings,

Fig. 1 represents in somewhat diagrammatic form one arrangement of apparatus embodying the invention;

Fig. 2 is a detail sectional elevation on the line 2—2, Fig. 1; and

Fig. 3 is a detail sectional view, on a larger scale, illustrating one of the elevator buckets.

The apparatus shown in the drawings performs the solvent extracting step in the extraction tower 10, to the upper portion of which solid material from which the oil is to be extracted, such as soy beans, cotton seed, flax seed, babassu nuts, or the like, is introduced to the tower chamber 10a through the supply channel 11 for slow descent through a rising column of solvent liquid, such as hexane, through the extracting chamber. The tower as a whole and its operating mechanism may be of any suitable form and are shown as similar to those shown in a prior application for Method and Apparatus for Separating Prepared Oil-Bearing Seed Oil and Solvent Mixture, Serial Number 551,244, filed August 25, 1944, by Louis F. Langhurst, now abandoned, to which reference may be had if desirable or necessary. It is sufficient here to say that the solid material travels down through openings in a series of shelves 12 over which it is moved by agitating arms or scrapers 13. The fine solids settle in a fines separator 14 and the miscella is withdrawn through an overflow outlet 15 which maintains the level of the liquid in the tower at the line A—A, Fig. 1.

The lower end of the chamber 10a communicates with the space within a bay of a casing 16 standing upright beside the tower and in which is mounted a power driven endless bucket elevator shown conventionally at 17, the buckets 17a of which are perforated, for draining, and travel over a horizontal shelf 18 below the tower chamber and to which the solid material under treatment gravitates. Thus the buckets serve as scrapers to sweep the solid material from shelf 18, fill themselves with it and carry it up through the liquid column in casing 16 to the liquid level at the line A—A, then somewhat above it to permit substantial drainage, and then dump the load as the buckets go over the top. Fresh or makeup solvent liquid is supplied to the top of this column and enters the extracting chamber above shelf 18 or through a side connection 19, or both.

The solid material thus elevated is discharged to and through suitable screw press valve mechanism, marked generally B, beyond which it travels through conduit 20 to and through steam heated meal driers 21, 22 connected in series.

Valve mechanism B, of course lies above the liquid level A—A. It may be of any suitable form and is shown somewhat conventionally as including a cylindrical perforate barrel 23 in which rotates a shaft 24 provided with a multiple flight continuous feeding worm 25, and with several longitudinally spaced expressing screw flights 26, as well as stationary stops or abutments 27 between flights and a yielding choke cone 28. The screw press unit is effective to express from the solid material a very large proportion of its liquid content, which is drained to trough 29 and is returned by conduit 30 to the liquid column in casing 16. Fresh or makeup solvent may be supplied to the system by a pipe 31 communicating with the trough 29.

As the solid material advances through the screw press the pressure applied to it increases progressively to an amount sufficient to form and maintain a compact solid plug at and around the choke cone, serving as a stopper to prevent passage, either way, of the solvent in either liquid or gaseous form.

In the dryers the last traces of solvent are expelled by the applied heat and are conducted by conduit 32 to recovery condensers (not shown).

The solid product leaves the final dryer by way of conduit 33 and a screw form meal seal conventionally shown at 34.

To enable the system to continue in operation even though screw press B is stopped, as for clean out or repair purposes, means is provided for bypassing this press when desired. As shown, the conduit 35, to which the bucket elevator discharges, has two branches 36, 37, the former leading to the press B and the latter to a simple screw conveyor 38, both discharging to conduit 20 leading to the driers.

Conduit 20 may be provided with one or more yielding plate or vane form valves 39, closing toward the press B, to prevent backward travel of solvent vapours.

The system as a whole is of simple form and avoids any chance of loss of liquid head in the extraction tower, even during standby periods. It simplifies both removal of solid material and supply of fresh solvent liquid. High efficiency in operation is accomplished and all parts are easily accessible for clean out or repair purposes.

Other advantages of the invention will be apparent to those skilled in the art.

What I claim is:

1. Solvent extraction apparatus comprising an upright chambered extraction tower, fines separator means at the upper end of said tower and in communication therewith, said tower being provided at the lower end thereof with a horizontal shelf upon which separated fines settle, means for supplying solid oil bearing material to the upper end of said tower, means for supplying volatile solvent liquid to said tower near the lower end thereof, liquid outflow means at the upper end of said fines separator whereby to maintain the level of liquid at substantially the level of said outflow means, means for continually withdrawing solid material from the lower end of said tower comprising an upright conduit at one side of said tower there being open communicating means between the lower ends of said conduit and said tower, elevator means in said conduit for solid material settling in said tower comprising an endless chain of buckets having a fines-receiving end at the lower end of said tower and a fines-delivery end at the upper end of said conduit, said buckets being movable across said shelf in scraping contact therewith, a continuously operating press near the fines-delivery end of said elevator and above said liquid level, a fines-conveying chute adapted to receive fines from said elevator, said chute being bifurcated to provide two branches, a first branch communicating with said press and a second branch bypassing said press, screw means in said press for advancing fines therethrough towards a discharge end while applying pressure thereto, said discharge end of said press being provided with vapor seal discharge means biased towards closed position but openable by fines being discharged therethrough, drier means adjacent said discharge means for said press for receiving fines discharged through said vapor seal discharge means, said second branch likewise being in communication with said drier means, conveyor means in said second branch whereby material is transferred directly from said elevator to said drier means without passing through said press, and means in said bifurcated fines-carrying chute for routing the material delivered by said elevator either through said first branch to said press or through said second branch to bypass said press.

2. Solvent apparatus as defined in claim 1 wherein trough means is provided beneath said press, said press having liquid drainage apertures in the lower wall thereof, and pipe means in communication with said trough means and with said conduit for returned drained liquid from said trough to said conduit.

RAYMOND T. ANDERSON.

REFERENCES CITED

The following references are of record in the file of this patent:

UNITED STATES PATENTS

| Number | Name | Date |
|---|---|---|
| 1,748,356 | Lawrence | Feb. 25, 1930 |
| 1,971,632 | Anderson | Aug. 28, 1934 |
| 2,150,608 | Olier | Mar. 14, 1939 |
| 2,187,890 | Pattee | Jan. 23, 1940 |
| 2,264,390 | Levine et al. | Dec. 2, 1941 |
| 2,276,298 | Frazier | Mar. 17, 1942 |
| 2,447,845 | Dinley | Aug. 24, 1948 |
| 2,516,968 | Faler | Aug. 1, 1950 |

FOREIGN PATENTS

| Number | Country | Date |
|---|---|---|
| 157,155 | Great Britain | Jan. 25, 1922 |